United States Patent [19]

Komatsuzaki et al.

[11] Patent Number: 4,933,702
[45] Date of Patent: Jun. 12, 1990

[54] CAMERA WITH NIGHT PHOTOGRAPHY APPARATUS

[75] Inventors: Hiroshi Komatsuzaki, Tokyo; Muneyoshi Sato, Saitama; Haruo Onozuka, Saitama; Tetuo Nishizawa, Saitama; Takao Umetsu, Saitama, all of Japan

[73] Assignee: Fuji Photo Film Co., Ltd., Kanagawa, Japan

[21] Appl. No.: 313,366

[22] Filed: Feb. 21, 1989

[30] Foreign Application Priority Data

Feb. 19, 1988 [JP] Japan ................................ 63-37201

[51] Int. Cl.[5] ...................... G03B 3/00; G03B 7/093; G03B 15/03
[52] U.S. Cl. ..................... 354/400; 354/419; 354/420; 354/456
[58] Field of Search ............... 354/400, 413, 419, 420, 354/422, 456

[56] References Cited

U.S. PATENT DOCUMENTS

| 3,805,278 | 4/1974 | Matsuzaki et al. | 354/420 |
| 4,500,191 | 2/1985 | Yamanaka | 354/419 X |
| 4,831,404 | 5/1989 | Fujita et al. | 354/413 X |

Primary Examiner—W. B. Perkey
Attorney, Agent, or Firm—Young & Thompson

[57] ABSTRACT

A controller recognizes the requirement for taking a scenic picture when a scenic picture-taking button is operated to indicate that a scene to be photographed is at infinity rather than at the longest focusable distance of an automatic focusing device, and then sets a taking lens system at an infinity focusing lens position, overriding the automatic focusing device. At the same time, when the scene at infinity is darker than a predetermined brightness level, the controller sets a shutter to open for a predetermined night photography exposure time which is greater than the maximum exposure time that could be set by an automatic exposure control device. When taking a night photograph, light emission from a strobe is prevented.

10 Claims, 3 Drawing Sheets

CAMERA WITH NIGHT PHOTOGRAPHY APPARATUS

BACKGROUND OF THE INVENTION

The present invention relates to a camera with a night photography device which adjusts the exposure time and the focus of the taking lens system to such conditions as are suitable for taking pictures at night.

In an automatic exposure control device (hereinafter referred to as an AE device) incorporated in a compact camera, a CdS element (cadmium sulfide element) is widely used as a photosensor. Analog signals detected by this CdS element, which correspond to the brightness of a scene to be photographed, are converted to digital signals and supplied to a microcomputer which calculates the proper exposure time by using these digital signals and internal exposure parameters of the camera relating to exposure, such as film sensitivity and the like. Since in the lower range of brightness, the linearity of a CdS element deteriorates and its resistance becomes so high as to require too much time for A/D conversion of the detected signals, the exposure times set by such an AE device are limited at most to about 1/10 second. By using such a conventional compact camera with an exposure time limiting function, it is difficult to take a night view because a longer exposure time, generally more than 1/10 sec., is required. In particular, it is impossible to take pictures at night with such a compact camera loaded with ordinary film having a low sensitivity of ISO 100.

OBJECT OF THE INVENTION

It is therefore a main object of the present invention to provide a camera with a night view taking device which overrides the limiting function of AE device so as to expose for a predetermined long exposure time when taking a night view.

It is a further object to provide a camera with a night view taking device which prevents a strobe from flashing so as not to waste the batteries when taking a night view.

SUMMARY OF THE INVENTION

To accomplish the above and other objects, according to the present invention, when taking a night view, in preference to the exposure time decided by the AE device, a predetermined exposure time for taking pictures at night is selected, which is longer than the maximum exposure time that could be selected by the AE device; and at the same time, the taking lens system is set at a predetermined focusing lens position suitable for infinity, independently of the automatic focusing device (hereinafter referred to as the AF device).

In accordance with a preferred embodiment of the invention, there is further provided means for preventing automatic flashing of a strobe when taking a night view.

In the camera according to the invention, when the camera is set in a scenic picture-taking mode and the brightness of a scene to be photographed is lower than a predetermined brightness level, the optimum focal point of the taking lens system is set to infinity; and at the same time, the exposure time is set at at least one predetermined night view exposure time longer than the maximum exposure time that could be set by the AE device. Therefore, according to the present invention, it becomes possible to take a sharp and correctly exposed picture at night. In addition, according to a preferred embodiment of the invention, since the light from the strobe as a practical matter does not illuminate the subject when taking pictures at night, the strobe is not actuated to flash in these cases so as not to waste the batteries by useless emission.

BRIEF DESCRIPTION OF THE DRAWINGS

The above and other objects of the present invention will become apparent from the following detailed description when read in connection with the accompanying drawings, wherein.

DETAILED DESCRIPTION OF THE INVENTION

Figure 1:
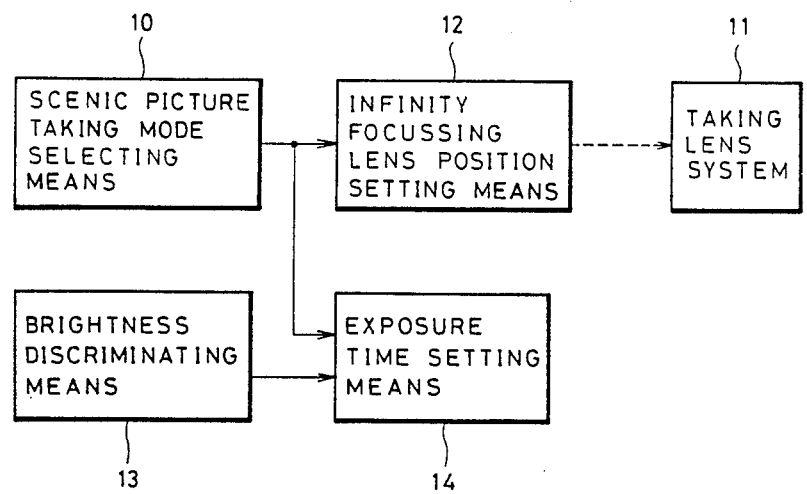
FIG. 1 is a schematic block diagram showing the overall construction of the present invention.

As shown in FIG. 1, a night view taking device in a camera according to the present invention comprises selection means 10 for selecting a scenic picture-taking mode, setting means 12 for setting a taking lens system 11 to a focusing lens position suitable for infinity in preference to the AF function, brightness discriminating means 13 for discriminating whether the brightness of a scene to be photographed is below a predetermined level, and exposure time setting means 14 which select a predetermined exposure time for taking pictures at night in preference to the exposure time decided by an AE device when the camera is set to the scenic picture-taking mode and the scene is darker than the above predetermined brightness level.

Figure 2:
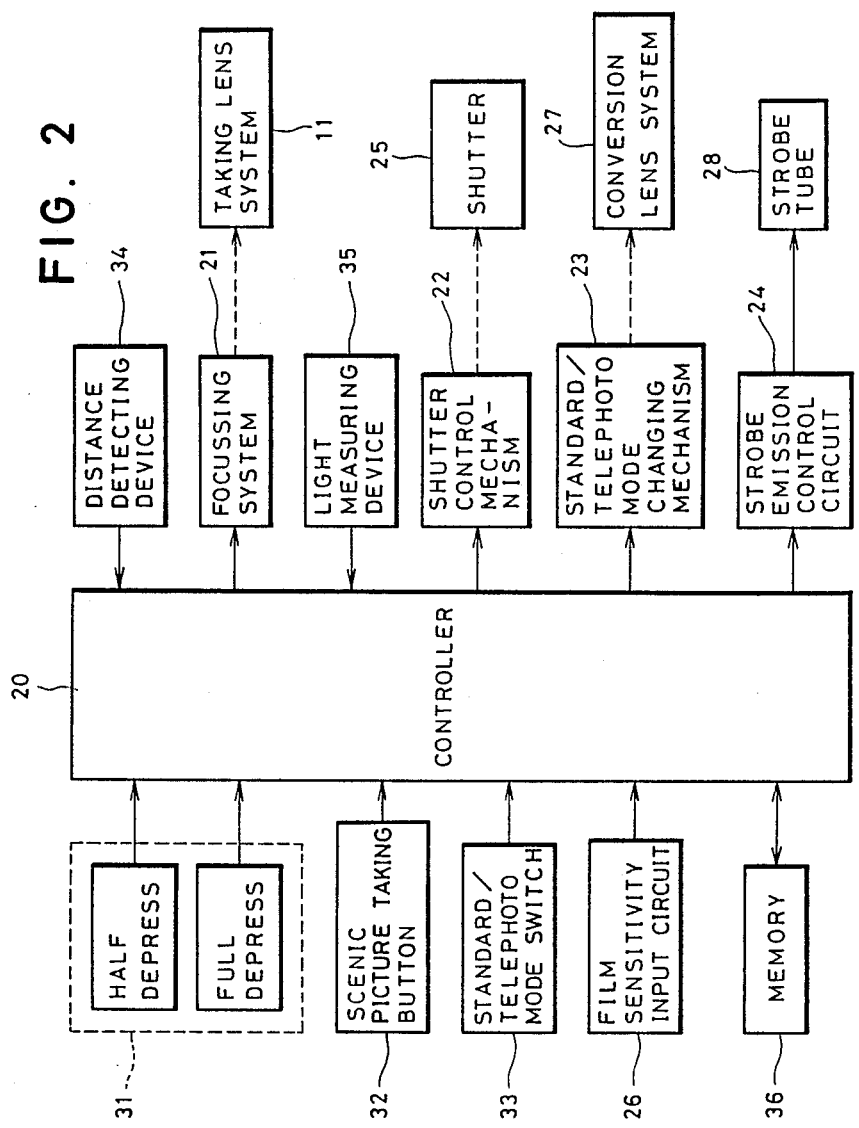
FIG. 2 is a schematic block diagram showing an embodiment of the present invention.

In FIG. 2, which shows in more detail the construction of the invention, a controller 20 having a microcomputer therein controls a focusing system 21, a shutter control mechanism 22, a standard/telephoto photographic mode changing mechanism 23 and a strobe emission control circuit 24. The focusing system 21 normally moves the taking lens system 11 to a lens position corresponding to a subject distance detected by a distance detecting device 34 in response to automatic focusing signals given by the controller 20. But in the scenic picture-taking mode, the focusing system 21 shifts the taking lens system 11 to a specific infinity focusing lens position rather than the longest focusing lens position at which the lens system 11 focuses on a subject at the greatest distance selectable by the AF device. It is to be noted that the taking lens system set at the longest focusing lens position in accordance with the AF device focuses most suitably on a subject at a distance of about 12 m, and at such a lens position subjects at infinity would be in focus thanks to the depth of field of the taking lens system 11. Therefore the longest focusing lens position of this invention corresponds to a conventional focusing lens position known as "infinity position". On the other hand, as described above, the taking lens system 11 set in the infinity focusing lens position focuses most suitably on a subject at infinity and is in focus on a subject at a distance of 12 m because of the depth of field. Accordingly, when the taking lens system 11 is set at the infinity focusing lens position in the scenic picture-taking mode, the scene at farther range becomes sharper in the picture recorded on the film in comparison with the case of setting the taking lens system 11 at the longest focusing lens position.

The shutter control mechanism 22 opens or closes a shutter 25 in response to the automatic shutter control signals or alternatively to the shutter control signals for taking pictures at night, both signals being selectively given by the controller 20. The automatic shutter control signals set the shutter at an exposure time according to the AE device, while the shutter control signals for taking pictures at night set the shutter at one of the predetermined exposure times therefor. As described heretofore when referring to the prior art, the maximum exposure time according to the automatic shutter control signals is limited to about 1/10 sec. by the limiting function of the controller 20. But according to the shutter control signals for taking pictures at night, the shutter is opened for a time sufficient to take a night picture by overriding the limiting function. Such an exposure time for night pictures is selected from a plurality of predetermined values as shown in the following Table 1.

TABLE 1

| Film Sensitivity | Standard Photography (sec.) | Telephotography (sec.) |
|---|---|---|
| 100 | 1/2 | 1 |
| 400 | 1/8 | 1/4 |
| 600 | 1/20 | 1/10 |

As shown in Table 1, the exposure time for night photography is set at 1/2 sec. when the camera is set in the standard mode and loaded with a film having a sensitivity ISO 100, while the exposure time for night photography is set at 1 sec. when the camera is set in the telephoto mode and loaded with a film having a sensitivity ISO 100. In the case of a film having a sensitivity ISO 400 or 600, the exposure time for night photography is given depending on whether the camera is set in a standard or telephoto mode. The film sensitivity is supplied to the controller 20 through a sensitivity input circuit 26 which detects the DX code of each film patrone and decodes it. The above described exposure times for night photography are stored as fixed data in a memory 36 of the controller 20; a suitable exposure time for night photography is read out from the memory depending on both film sensitivity and whether the camera is in standard or telephoto mode. The standard/telephoto mode changing mechanism 23 changes over the camera mode between the standard and telephoto modes in response to changeover control signals from the controller 20 by placing a conversion taking lens system 27 in and out of the optical path of the taking lens system 11 as is well known in the art. It may be possible to use a zoom taking lens system as the taking lens system 11. The strobe emission control circuit 24 actuates a strobe tube 28 to emit light in response to strobe actuating signals from the controller 20.

A shutter button 31 is depressed by two steps. Namely, when the shutter button 31 is depressed half way, a start signal is generated, and when the shutter button is fully depressed, a release signal is generated. If the shutter button 31 is depressed half way while a scenic picture-taking button 32 is pushed, the controller 20 recognizes the requirement for taking a scenic picture and gives the focusing system 21 signals to position the taking lens system 11 at the infinity focusing lens position. A switch 33 supplies signals for switching between standard/telephoto modes to the controller 20, which then judges whether the camera is to be set in the standard or telephoto mode and gives corresponding changing control signals to the standard/telephoto mode changing mechanism 23. On the other hand, if the shutter button 31 is depressed half way while the scenic picture-taking button 32 is not pushed, the controller 20 recognizes the subject distance depending on the distance data from the distance detecting device 34 and supplies automatic focusing signals to the focusing mechanism 21. When the shutter button 31 is depressed half way, the brightness data of the scene to be photographed is also supplied from a well-known light measuring device 35 including a CdS element to the controller 20. When the scenic picture-taking button 32 is not pushed, or otherwise when the scene to be photographed is not so dark as to need artificial illumination by the strobe light (LV>7.5, in this embodiment), upon fully depressing the shutter button 31 the controller 20 determines an exposure time depending on the above brightness data as well as internal exposure parameters of the camera such as film sensitivity and so forth, and gives automatic shutter control signals to the shutter control mechanism 22. When the shutter button 31 is fully depressed while the scenic picture-taking button 32 is pushed, and when the scene is so dark as to need usually the strobe light (LV≦7.5, in this embodiment), the controller 20 reads out a suitable exposure time for night photography depending on the sensitivity of the loaded film as well as whether the camera is set in the standard or telephoto mode, and selects the exposure time for night photography in preference to the above AE exposure time. The controller 20 then gives the shutter control signals for night photography to the shutter control mechanism 22.

The controller 20 further has a function to prevent the automatic flashing of the strobe 28 independently of the brightness of the scene to be photographed when the taking lens 11 is set at the infinity focusing lens position by pushing the scenic picture-taking button 32, in order not to run down the batteries due to unnecessary flashing.

Figure 3:
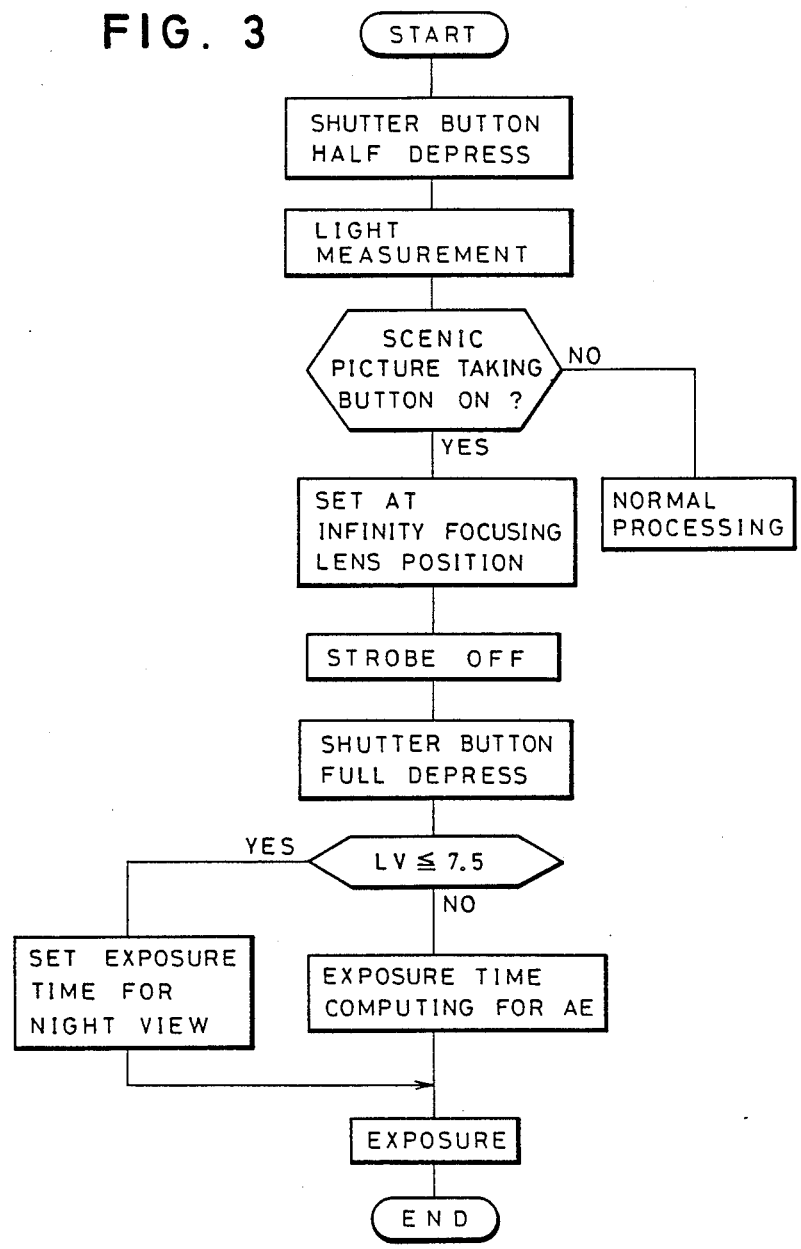
FIG. 3 is a flow chart showing the sequential operation of the embodiment shown in FIG. 2.

The operation of the embodiment shown in FIG. 2 will now be described with reference to FIG. 3 showing a sequential operation in the scenic picture-taking mode. Upon depressing the shutter button half way, the brightness of the scene to be photographed is measured. In the next step, it is determined whether the scenic picture-taking button 3 is pushed. If not, a normal processing step is selected wherein the AE device and AF device are effective. On the other hand, if the scenic picture-taking button 32 is found to be pushed, the controller 20 causes the focusing system 21 to position the taking lens system 11 at the infinity focusing lens position, in which the taking lens system focuses most suitably on a subject at infinity, and then the strobe 28 is turned off.

Thereafter, upon depressing the shutter button 32 to the end position thereof, it is determined whether the camera is to be set in the night photography mode, for example by comparing the detected brightness of the scene with a predetermined level. In this embodiment, if the LV (light value) is higher than 7.5, an exposure time is decided according to the AE function depending on the detected brightness of the scene as well as on the exposure parameters of the camera such as film sensitivity. Corresponding to the above determined AE exposure time, automatic shutter control signals are supplied to the shutter control mechanism 22 so that the shutter 25 is controlled to open for this AE exposure time. If the LV is not more than 7.5, a suitable predetermined exposure time for night photography is read out from the memory 36 depending on the sensitivity of the loaded film and whether the camera is st in the standard or telephoto mode. The controller 20 sends to the shutter control mechanism 22 corresponding shutter control signals for night photography, upon receipt of which the shutter 25 is caused to open for the selected exposure time for night photography. Consequently, in spite of an AE function which would otherwise limit the maximum exposure time to, say, 1/10 sec., an exposure time sufficient for night photography is given in preference to the AE function. Moreover, since the strobe emission control circuit 24 is kept off when the scenic picture-taking button is pushed, useless flashing of the strobe 28 is prevented.

As described so far, when the scenic picture-taking button 32 is not pushed, the AF device is actuated to set the taking lens system 11 at an automatic focusing lens position. If, at that time, the LV of the scene to be photographed is higher than 7.5, the controller 20 decides an exposure time depending on the brightness of the scene in the well known manner; but if the LV is not more than 7.5, the controller 20 sets the exposure time at the maximum value, e.g. 1/10 sec., preferably 1/30 sec., according to the AE function, and the strobe 28 automatically emits light in synchronization with the shutter release. On the other hand, when the scenic picture-taking button 32 is pushed, the taking lens system 11 is set at the infinity focusing lens position independently of the AF device. In this scenic picture-taking mode, even were the above limiting function of the AE device to be effected, the camera is set to the night photography mode wherein a suitable one of predetermined exposure times for night photography is selected and effected independently of the AE device. In addition, the strobe 28 is prevented from emitting light in the night photography mode.

In the above-described embodiment, the same threshold level LV=7.5 is used for both the limiting function of the AE device and the mode change in relation to night photography, so that only one brightness discriminating means 13 is provided. This makes the camera simple in construction. However, it may be possible to use other threshold levels, or these threshold levels may be different from each other. The threshold level for night photography may be set at for example LV=4. In this case, the exposure time is set to 1/10 sec. in the range of $4 \leq LV \leq 7.5$, and the night photography mode is selected only when the scenic picture-taking button 32 is pushed and LV<4.

Although the light measuring device 35 according to the above embodiment operates as an external photometric system, it may be possible to use an internal photometric system in which photosensors provided behind the taking lens system 11 detect the brightness of a subject through the taking lens system. It may also be possible that the infinity focusing lens position in the scenic picture-taking mode is equal to the longest focusing lens position of the taking lens system according to the AF function.

Although the present invention has been fully described by way of a preferred embodiment thereof with reference to the accompanying drawings, it is to be understood that other variations and modifications will be apparent to those skilled in the art. Therefore, unless otherwise such changes and modifications depart from the true scope of the present invention, they should be construed as included therein.

What is claimed is:

1. A camera having an automatic focusing device for automatically focusing a taking lens system and an automatic exposure device for automatically determining an exposure time depending on the brightness of a scene to be photographed and for limiting said exposure time to a predetermined maximum exposure time when the brightness of the scene to be photographed is no higher than a first brightness level, comprising:

operable means for selecting a scenic picture taking mode, in which mode said automatic focusing device is not effective for focusing;

means for setting said taking lens system at an infinity focusing lens position in said scenic picture-taking mode, at which said taking lens system focuses on a subject at infinity rather than at the longest focusable distance of said automatic focusing device;

brightness discriminating means for outputting a night photography signal when a scene to be photographed is below a second brightness level which is no higher than said first brightness level; and means for setting a night photography exposure time instead of a time set by said automatic exposure control device when said brightness discriminating means outputs said night photography signal in said scenic picture-taking mode, said night photography exposure time being longer than said predetermined maximum exposure time.

2. A camera as defined in claim 1, further comprising means for preventing automatic emission of a strobe in said scenic picture-taking mode.

3. A camera as defined in claim 1, wherein said night photography exposure time is set at one of a plurality of predetermined values in accordance with the focal length of said taking lens system.

4. A camera as defined in claim 1, wherein said night photography exposure time is set at one of a plurality of predetermined values in accordance with the film sensitivity of the loaded film.

5. A camera as defined in claim 3, wherein said night photography exposure time is longer the longer is said focal length.

6. A camera as defined in claim 4, wherein said night photography exposure time is shorter the higher said film sensitivity.

7. A camera as defined in claim 3, further comprising a memory for storing said plurality of predetermined night photography exposure times.

8. A camera as defined in claim 4, further comprising a memory for storing said plurality of predetermined night photography exposure times.

9. A camera as defined in claim 1, wherein said brightness discriminating means is also used for judging whether the brightness of a scene to be photographed is lower than said first brightness level so as to limit the exposure time to said predetermined maximum exposure time, and said first brightness level is equal to said second brightness level.

10. A camera having an automatic focusing device for automatically focusing a taking lens system and an automatic exposure device for automatically determining an exposure time, said exposure time determined by said automatic exposure device not exceeding a predetermined maximum exposure time, comprising:

operable means for selecting a scenic picture taking mode in which mode said automatic focusing device is not effective for focusing;

means for setting said taking lens system at an infinity focusing lens position in said scenic picture-taking mode, at which said taking lens system focuses on a subject at infinity rather than at the longest focusable distance of said automatic focusing device; and means for setting a night photography exposure time instead of the time that would be set by said automatic exposure control device in said scenic picture-taking mode, when the brightness of a scene to be photographed is lower than a predetermined brightness level, said night photography exposure time being longer than said predetermined maximum exposure time.

* * * * *